May 3, 1960
W. KAUT, JR
2,934,882
GUARD FOR A LAWN MOWER
Filed July 28, 1958
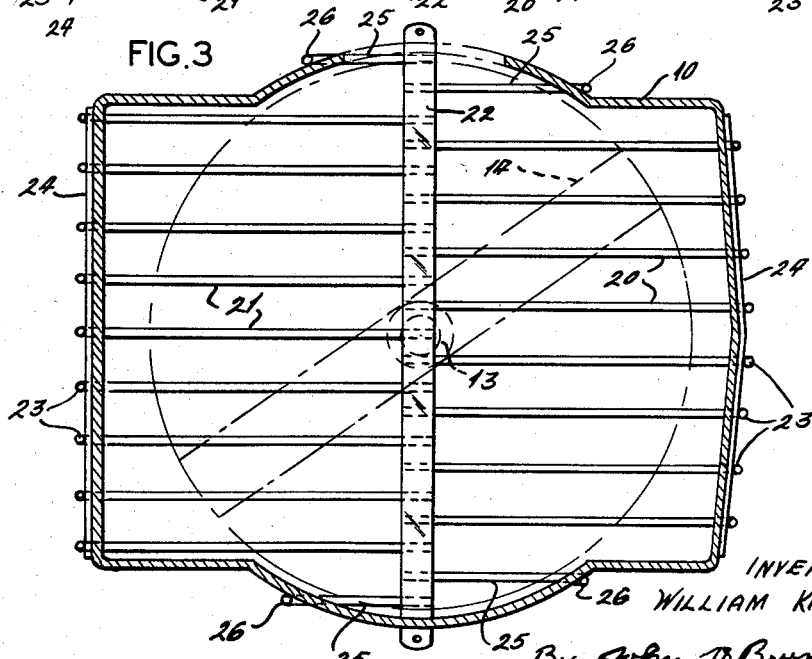
INVENTOR:
WILLIAM KAUT JR
By John B. Brueninger
ATTORNEY.

United States Patent Office 2,934,882
Patented May 3, 1960

2,934,882
GUARD FOR A LAWN MOWER
William Kaut, Jr., Creve Coeur, Mo.
Application July 28, 1958, Serial No. 751,244
2 Claims. (Cl. 56—255)

This invention relates to mowers and more particularly to lawn mowers.

A mower of the character described has a cutter and a casing enclosing the top and sides of the cutter; and in a power operated mower a motor either of the internal combustion type, or an electric motor, is mounted on the casing to operate the cutter. However, the bottom of the casing must be left open to permit the cutter to cut or clip the vegetation, such as grass. The cutter is therefor left exposed and if moved over an obstacle will strike the same. If the obstacle be a foot or hand of the operator, it may be severely damaged. If the obstacle be a small animal, such as a baby rabbit, the latter will be severely injured and in some cases killed. If the obstacle be something inanimate, such as rock or wood, the cutter will be damaged or dulled and in some cases broken.

While guards have been provided for the bottom of the mower casing, and where the guard comprises continuous parallel bars, then accordingly, there will be upstanding grass ridges left below each bar as the mower moves over the ground.

One of the objects of this invention therefor is to provide a guard of a novel construction operating in an improved manner.

Further objects will appear from the detailed description in connection with the accompanying drawing disclosing embodiments of this invention; it is to be understood that this invention is not to be restricted or limited to the embodiments disclosed and shown, except as defined by the appended claims.

In the drawing:

Fig. 1 is a perspective view of a standard lawn mower of the motor driven type showing the guard attached to the bottom of the casing;

Fig. 2 is an enlarged longitudinal section along the line 2—2, Fig. 1;

Fig. 3 is a bottom sectional view along the line 3—3, Fig. 2;

Fig. 4 is a perspective view of a guard illustrating one embodiment of this invention; and Fig. 5 is a partial perspective view showing another embodiment of this invention.

Generally stated and in accordance with illustrated embodiments of this invention, the guard comprises sections of spaced parallel bars arranged in transverse staggered relation. The guard comprises sections, each section having bars arranged in spaced parallel relation, the bars of the sections being arranged in transverse staggered relation. Suitable means are provided for locating the guard on a mower casing, and means are provided for attaching the guard to a mower casing.

Referring to the accompanying, Fig. 1 shows generally a lawn mower comprising a casing 10, provided with wheels 11, and having mounted thereon a motor 12, whose shaft 13 carries a cutter 14 of any suitable construction. The cutter is positioned, as shown in Fig. 2, at a distance above the wheels 11, and in some cases above the bottom of the casing, which distance is usually adjustable in any suitable manner. In such a mower, unless provided with a guard, the bottom of the casing is left open.

The guard comprises sections of spaced parallel long-bars 20 and 21, that is they extend along the direction of movement of the mower. These long-bars of the respective sections are arranged in transverse staggered relation. That is accomplished in Figs. 1–4 by attaching the long-bars 20 and 21 of the respective sections to a cross-bar 22, as by welding. The outer ends of the long-bars are bent upwardly, as shown at 23, or are attached to cross-pieces 24 in any suitable manner, as by welding. The cross-bar 22 has at each end thereof attached thereto locating bars 25 also in transverse staggered relation, which are bent up as shown at 26 bearing against the outside or inside of the casing in order to locate the guard laterally, while the cross-pieces 24 locate the guard longitudinally by taking against the ends of the casing. The ends of the cross-bar 22 are provided with spring suspensions 27, having eyes 28 by which the guard may be held on the casing 10 by any suitable fastener, such as screws 29.

In Fig. 5 the cross-bar 22 of Figs. 1–4 is omitted and the long-bars 200 and 210 attached to the cross-bars 240 are connected by bends 31, extending transversely of the guard so that the long-bars 200 and 210 are again in transverse staggered relation.

The bends 31 of each of the outer long-bars 200 and 210, only one side of which is shown in Fig. 5, are connected by pieces 33 to the locating bars 250 also in transverse staggered relation and having upstanding bends 260. An extension 34 is attached at 35 to the suspension 270 having an eye 280. The attachment of the guard of Fig. 5 to the mower casing can be made as in Fig. 1.

In Figs. 1–4, the guard, which is removable, is located on the bottom of the mower casing by the cross-pieces 24 and the locating bars 25 and then attached by the suspension 27.

As the mower moves over the ground, the vegetation, such as grass, is depressed by the forward long-bars 20 and will be cut off by the cutter 14. However, as the grass strikes the cross-bar 22, the grass will be pressed down by the forward long-bar 20 and will move into the spaces between the rear long-bars 21 and will also be cut off. In this way, small upwardly projecting ridges of grass which have been pressed down by the forward long-bars 20 will be cut off after they have passed the cross-bar 22 and go inbetween the rear long-bars 21. In that manner, the cut grass will show an even appearance and will not have the unsightly ridges as usual.

In Fig. 5 the forward long-bars 200 are again in staggered relation with respect to the rear long-bars 210, and the operation will be the same as here in Figs. 1–4, because the bends 31 in Fig. 5 act in the same sense usually as does the cross-bar 22 in Figs. 1–4.

In accordance with this invention therefore, the guard for a mower has a support and has a cutter at the bottom thereof, the guard having means 27—28 adapted for attachment to the bottom of the support and below the cutter. The guard comprises connected sections of spaced long-bars 20 and 21 arranged in parallel relation along the longitudinal axis of the support, the bars of the respective sections being arranged in transverse staggered relation. The long-bars of the respective sections are connected by means 22 and 31 transverse to the long-bars.

Having thus described the invention, what is claimed and desired to be secured by Letters Patent is:

1. A guard for a mower hoving a support and having a cutter at the bottom thereof, said guard having means adapted for attachment to the bottom of the support and below the cutter, said guard comprising, connected sections of spaced long-bars arranged in parallel relation along the longitudinal axis of the support, the long-bars of the respective sections being arranged in transverse staggered relation.

2. A guard for a mower having a support and having a cutter at the bottom thereof, said guard having means adapted for attachment to the bottom of the support and below the cutter, said guard comprising, connected sections of spaced long-bars arranged in parallel relation along the longitudinal axis of the support, the long-bars of the respective sections being arranged in transverse staggered relation, the long-bars of the respective sections being connected by means extending transverse of the long-bars.

References Cited in the file of this patent

UNITED STATES PATENTS

| | | |
|---|---|---|
| 1,899,564 | Frey | Feb. 28, 1933 |
| 2,149,463 | Orr | Mar. 7, 1939 |
| 2,539,779 | Grosso | Jan. 30, 1951 |
| 2,557,598 | Daggett | June 19, 1951 |
| 2,701,942 | Caldwell et al. | Feb. 15, 1955 |
| 2,802,327 | Thelander | Aug. 13, 1957 |